United States Patent
Marron et al.

[11] Patent Number: 5,951,114
[45] Date of Patent: *Sep. 14, 1999

[54] WHEEL FOR A MOTORIZED LAND VEHICLE

[75] Inventors: Guy Marron, Gardanne; Patrick Murru, Martigues, both of France

[73] Assignee: Sollac, Puteaux, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,587

[22] Filed: Nov. 27, 1996

[30] Foreign Application Priority Data

Dec. 7, 1995 [FR] France .................................. 95 14439

[51] Int. Cl.$^6$ ...................................................... B60B 3/00
[52] U.S. Cl. ..................................... 301/63.1; 29/894.325
[58] Field of Search ..................... 301/63.1, 9.1; 29/894.32, 894.323, 894.325

[56] References Cited

U.S. PATENT DOCUMENTS

| | | | |
|---|---|---|---|
| 1,812,437 | 6/1931 | Hunt | 301/63.1 |
| 2,090,254 | 8/1937 | Eksergian | 301/63.1 |
| 2,406,062 | 8/1946 | Cornell | 29/894.325 |
| 3,627,382 | 12/1971 | Lejeune | 301/63.1 |
| 5,509,726 | 4/1996 | Overbeck | 301/63.1 |

FOREIGN PATENT DOCUMENTS

| | | | |
|---|---|---|---|
| 839655 | 4/1939 | France | 301/63.1 |
| 5145001 | 11/1980 | Japan | 301/63.1 |

*Primary Examiner*—Russell D. Stormer
*Attorney, Agent, or Firm*—Oblon, Spivak McClelland, Maier & Neustadt, P.C.

[57] ABSTRACT

A wheel for a motorized land vehicle is composed of a wheel body and a roughly cylindrical wheel rim. The wheel body consists of a roughly cylindrical central part which serves to center and to mount the wheel on the axle hub of the vehicle. It also consists of an interior riser which is roughly conical and another inverted conical part that, together with the interior riser, defines a camber nose that has a large bend radius. The inverted conical part ends in a cut-off edge designed for the connection of the wheel body and the wheel rim. The wheel body is composed of at least two connected circular parts that vary in thickness and/or mechanical characteristics and are butt welded together.

5 Claims, 3 Drawing Sheets

WHEEL FOR A MOTORIZED LAND VEHICLE

BACKGROUND OF THE INVENTION

1. Field of the Invention

The invention relates to a wheel for a motorized land vehicle. The present invention further relates to a process for manufacturing a motorized vehicle wheel.

2. Description of the Related Art

The components of a motorized land vehicle wheel are generally obtained by pressing and/or turning using a homogeneous sheet metal blank. The various forming operations ultimately produce a wheel body profile generally consisting of five concentric circular zones. These are the central part which serves to mount the wheel on the axle hub of the vehicle; the interior riser, which is roughly conical and connects the central part and the top of the wheel called the camber nose; the camber nose that has a large bend radius; the end part of the camber nose, which is an inverted conical part on which stress reduction holes are located; and a cut-off edge by which the wheel body is generally connected to the wheel rim.

The known manufacturing process for a wheel body using a homogeneous sheet metal blank has the major disadvantage of not distributing the thicknesses in a desirable manner, e.g., in correlation to the anticipated stresses. For example, the most stressed area of the wheel body during operation is the camber nose; the least stressed area is the cut-off edge. To ensure an adequate minimum thickness in all areas despite localized thinning when forming the sheet metal blank, the steel thickness is over-sized. This unnecessarily increases the weight of the wheel.

SUMMARY OF THE INVENTION

It is an object of the invention to reduce the weight of the wheel.

A further object of the invention is a manufacturing process for a motorized land vehicle wheel body.

It is yet a further object of the invention to locally optimize the mechanical characteristics and the thicknesses of the wheel body in accordance with the stresses imposed on the various wheel parts during use.

The above and other objects of the invention are achieved by a wheel for a motorized land vehicle, comprising a wheel body and a substantially cylindrical wheel rim. The wheel body consists of a substantially cylindrical central part that comprises a bearing which serves to center and to mount the wheel on the axle hub of the vehicle. It also consists of an interior riser which is substantially conical and another inverted conical part that, together with the interior riser, defines a camber nose that has a large bend radius. The inverted conical part ends in a cut-off edge designed for the connection of the wheel body and the wheel rim. The wheel body is composed of at least two connected circular parts that vary in thickness and/or mechanical characteristics.

According to a further feature of the invention, a method for producing the wheel includes the steps of cutting out at least two disks from metal sheets of different thicknesses and/or with different mechanical characteristics, fitting the disks together concentrically; butt welding the at least two plane concentric disks to form a sheet metal blank; and shaping the sheet metal blank which is composed of the two welded disks so that the various parts of the wheel body are adapted to the mechanical and physical characteristics at the locations where stresses are induced by the load exerted on the wheel.

The disks may be welded using a laser welding device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
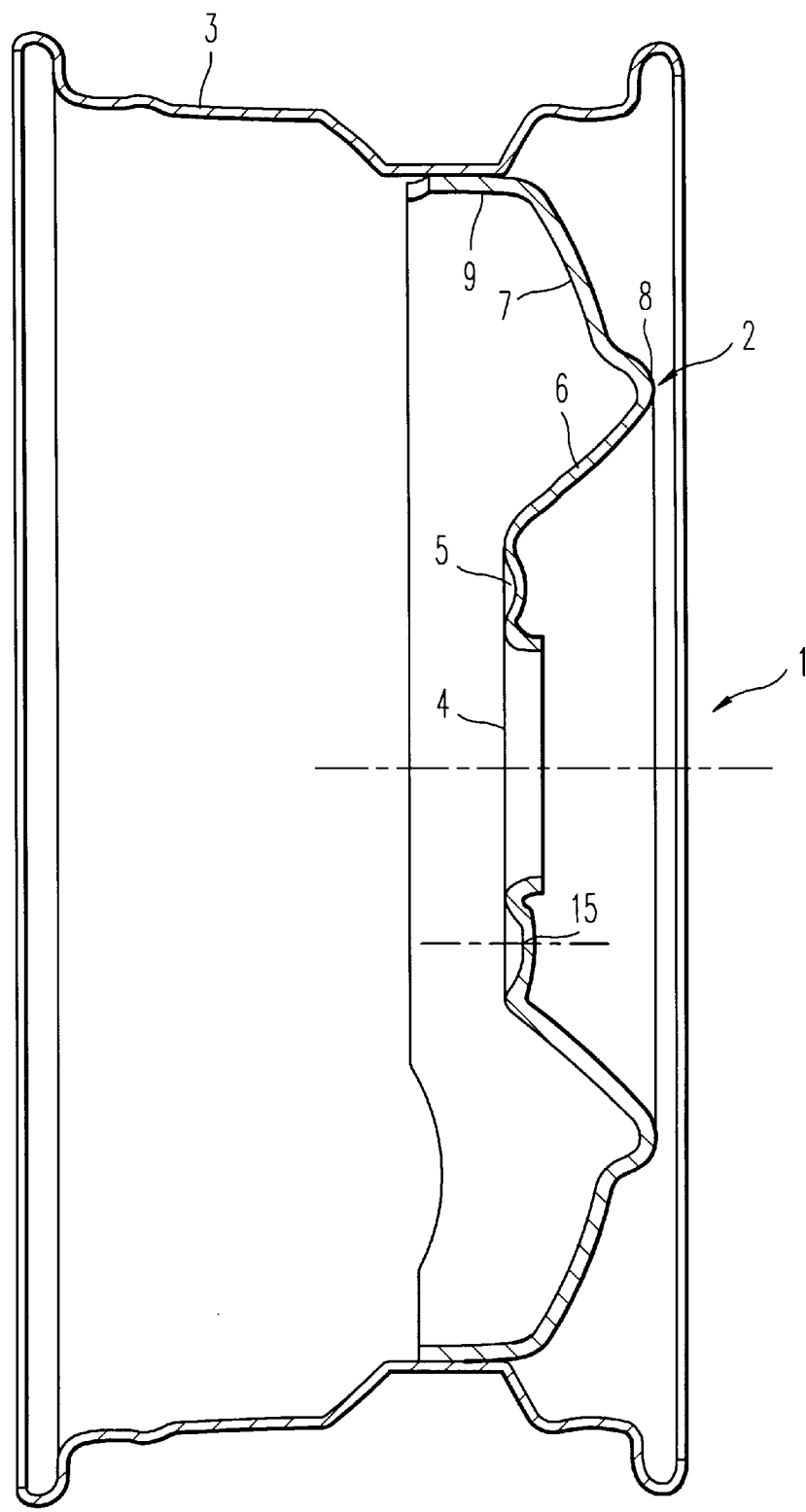
FIG. 1 is a sectional view of a wheel for a motorized land vehicle showing the various parts of said wheel.

As shown in FIG. 1, a wheel according to the invention comprises a wheel body 2 and a roughly cylindrical wheel rim 3. The wheel body 2 consists of a roughly cylindrical central part 4 having a bearing 5 which serves to center and to mount the wheel 1 on an axle hub. An interior riser 6, which is roughly conical, connects the central part to an inverted conical part 7 that, along with the interior riser 6, defines a camber nose 8 with a large bend radius. The inverted conical part 7 ends in a cut-off edge 9 designed for connection of the wheel body 2 with the wheel rim 3.

The body of the wheel is produced by cutting out at least two disks from sheet metals of different thicknesses and/or with different mechanical characteristics and arranging the disks to fit together concentrically. The disks are butt welded to form a composite sheet metal blank which is shaped into the wheel whose characteristics are correlated to the load exerted on different parts of the wheel.

Figure 2:
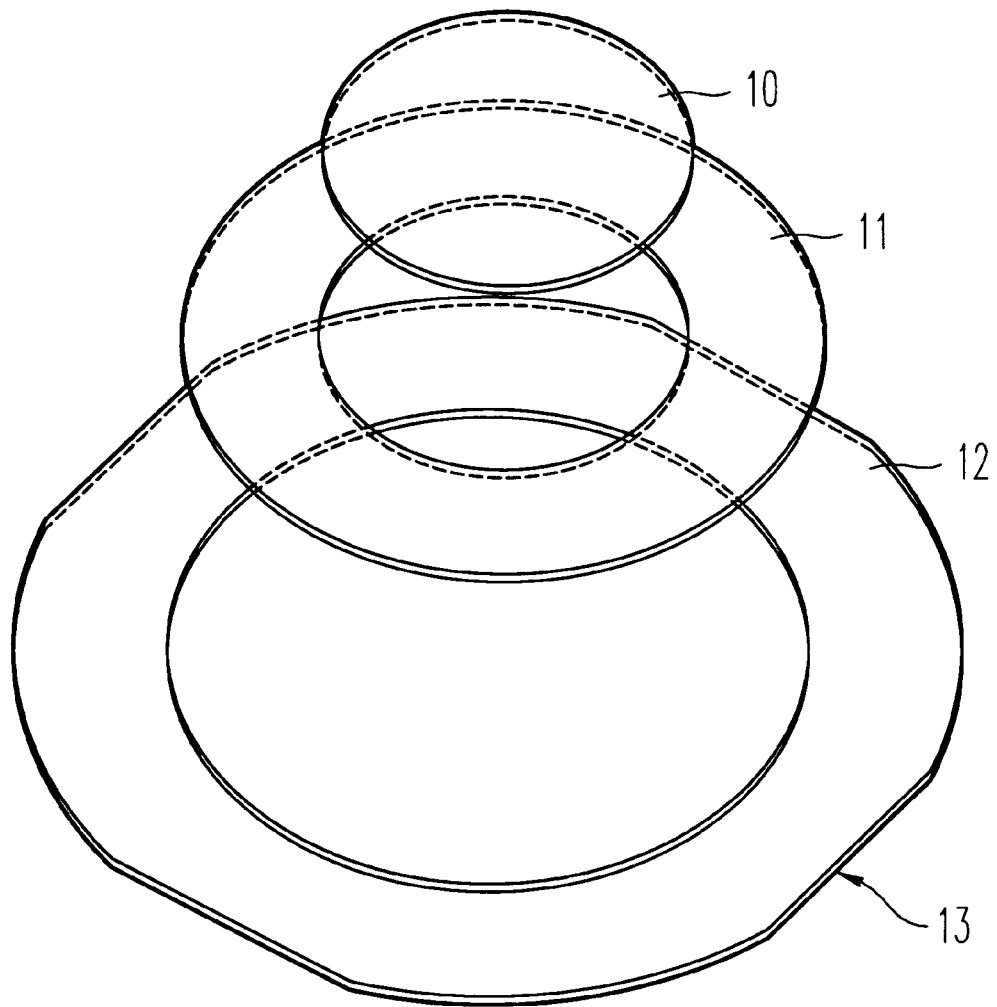
FIG. 2 is a view of a sheet metal blank in accordance with the invention prior to welding.

In the example shown in FIG. 2, the blank 13 is composed of three planar disks 10, 11 and 12 which are arranged concentrically and are ready for welding, for example buttseam welding.

Theoretically, the blank according to the invention possesses localized variations in thickness and/or in mechanical characteristics to obtain, after shaping of the wheel body, the optimal thicknesses with respect to the loads imposed on the wheel during its operation. To accomplish this, the sheet metal disks have different thicknesses and/or different mechanical characteristics. The disks are, for example, joined end-to-end by laser welding, but they can also be joined by any other means.

In the example of FIG. 2, disk 10 is used for the central part 4 of the wheel body 2 which defines a bearing 5. This is the part in which holes 15 are punched for mounting the wheel 1 onto the axle hub.

Disk 11 is used for the part where the wheel camber nose 8 is located, a particularly critical zone from the perspective of mechanical fatigue.

Disk 12 is used for the end part 7 of the camber nose 8 and for the cut-off edge 9 serving as a support for the wheel rim 3.

The characteristics of these three disks are as follows:

Disk 10 must have good molding ability, collar curing ability and hole expansion ability for the creation of seating radii with the interior riser 6 of the camber nose 8 as well as for creating mounting holes 15.

Disk 11 must have good fatigue and damage resistance. It is preferably set during the composite blank production to form the camber nose 8.

Disk 12 must have good contraction ability and good resistance to notch effect; it should also have good welding properties. Preferably, it forms the peripheral part of the composite sheet metal mold.

The choice of the composition and/or thickness of each disk is determined on the basis of fatigue testing. It depends on the forming process. For example, for a zone with severe punching, it will be advantageous that the corresponding disk have good cutting ability.

The exterior disk 12 of the wheel body can be of a relatively small thickness or have relatively low mechanical characteristics. It must be made of weldable sheet metal.

Disk 11 intended to form the camber nose 8 must be made of a sheet steel with good mechanical characteristics for pressing.

Figure 3:
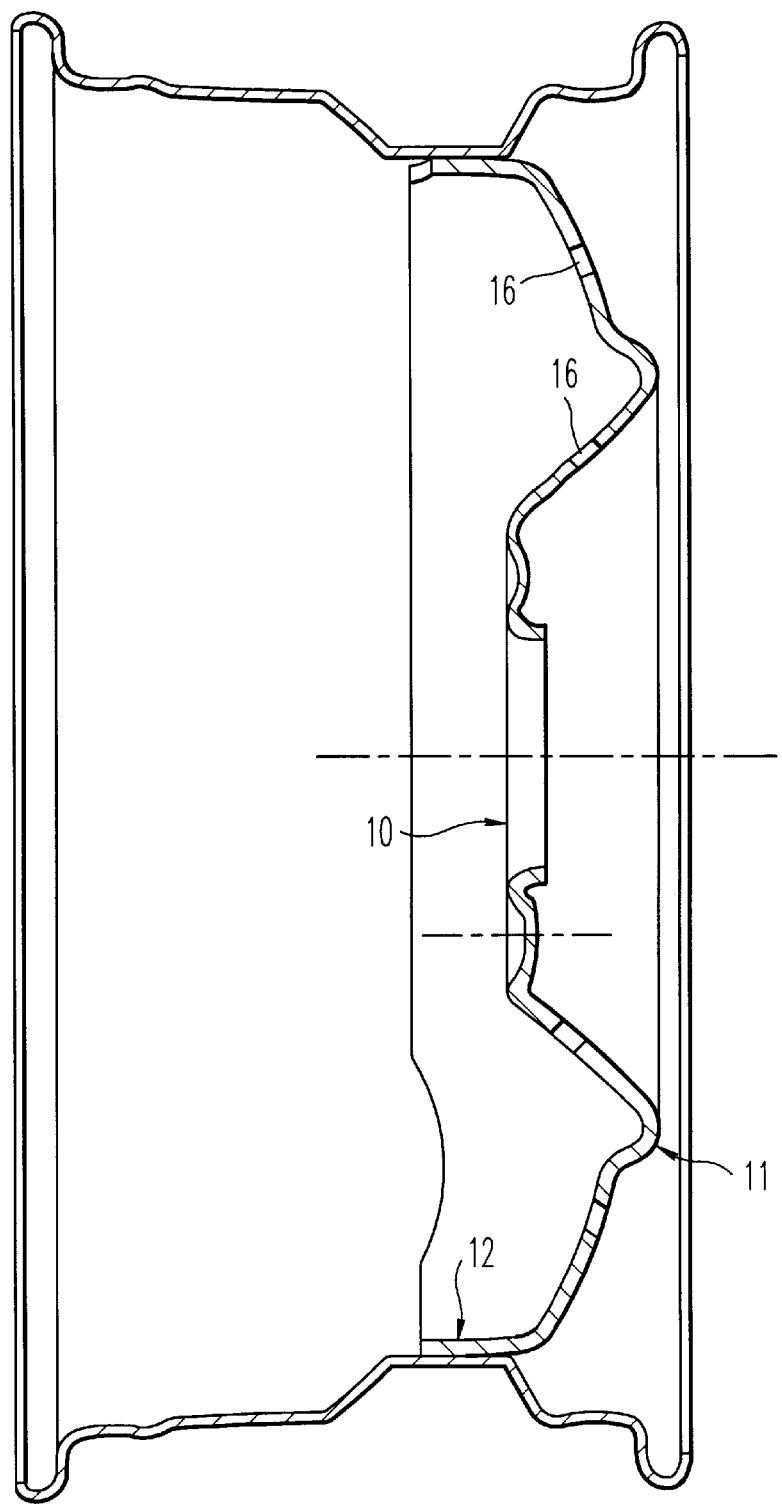
FIG. 3 is a sectional view of a vehicle wheel in accordance with the invention.

FIG. 3 shows a wheel in accordance with the invention consisting of a wheel body comprising three disks 10, 11, 12 welded end-to-end, the joining being accomplished at weld seams 16.

Table 1 below presents the characteristics of the three disks from the standpoint of metallurgic composition and thickness in four sample embodiments of the wheel. The steel compositions are chosen to correspond to the molding, static, and dynamic mechanical resistance requirements related to each of the wheel parts.

The thicknesses are selected for an optimization of the weight of the wheel vis-à-vis maximum fatigue stress criteria.

The reference is a known wheel manufactured in the industry. The wheel body is there obtained from a single sheet metal blank of E 24 grade and 3.9 mm thick.

The disks A–D in accordance with the invention are produced from steel composed of the highest mechanical characteristics. This creates a lighter wheel.

TABLE 1

| Example | Disk Number | Disk Material | Disk Thickness in mm |
| --- | --- | --- | --- |
| A | 10 | HR55 | 3.3 |
|   | 11 | HR80 | 3.1 |
|   | 12 | E24 | 3.3 |
| B | 10 | HR55 | 3.3 |
|   | 11 | DP60 | 3.3 |
|   | 12 | E24 | 3.3 |
| C | 10 | HR55 | 3.3 |
|   | 11 | HR60 | 3.4 |
|   | 12 | E24 | 3.3 |
| D | 10 | E24 | 3.5 |
|   | 11 | S355 | 3.6 |
|   | 12 | E24 | 3.3 |
| Reference |   | E24 | 3.9 |

TABLE 2

| Example | weight (Kg) | reduction (%) |
| --- | --- | --- |
| A | 3.25 | 16.87 |
| B | 3.31 | 15.38 |
| C | 3.34 | 14.64 |
| D | 3.43 | 12.39 |

The wheel in accordance with the invention comprises different thicknesses of sheet metal distributed in the wheel body so as to optimize the mechanical and physical characteristics of the sheet metal of the mold and of the sheet metal itself in areas where stresses are induced by the load of the wheel during its operation.

Obviously, numerous modifications and variations of the present invention are possible in light of the above teachings. It is therefore to be understood that the invention may be practiced otherwise than as specifically described herein.

We claim:

1. Wheel for a motorized land vehicle comprising:

a wheel body; and a substantially cylindrical wheel rim, wherein the wheel body comprises:

a) a substantially planar central part comprising a bearing for centering and mounting the wheel on an axle hub, b) a substantially concial interior riser concentrically surrounding said central part, c) an inverted conical part concentrically surrounding said interior riser, wherein said interior riser and said inverted conical part together define a camber nose with a large bend radius, the inverted conical part ending in a cut-off edge for the connection of the wheel body to the wheel rim, wherein the wheel body is comprised of at least three radially separated parts joined end to end, with at least one of different thicknesses and different mechanical characteristics selected based upon operational loads to which the wheel is to be subjected.

2. Wheel in accordance with claim 1, wherein the disks are assembled by laser welding.

3. Wheel in accordance with claim 1, wherein the radially separated parts include a radially innermost part comprising both said substantially planar central part and at least a portion of said substantially conical interior riser.

4. Manufacturing process for a wheel comprising a wheel body and a substantially cylindrical wheel rim, comprising the steps of:

forming at least two disks from sheet metals of at least one of different thicknesses and different mechanical characteristics;

fitting the disks together concentrically and in correlation to stresses induced by loads on various parts of the wheel body;

butt welding the disks to form a blank of a wheel body;

shaping the blank into a wheel body; and attaching the wheel body to the wheel rim.

5. The process of claim 4 wherein said forming step comprises forming at least three discs.

* * * * *